United States Patent
Kuwabara

(10) Patent No.: US 10,199,664 B2
(45) Date of Patent: Feb. 5, 2019

(54) FRAME BODY, CELL FRAME, CELL STACK, AND REDOX FLOW BATTERY

(71) Applicant: Sumitomo Electric Industries, Ltd., Osaka-shi (JP)

(72) Inventor: Masahiro Kuwabara, Osaka (JP)

(73) Assignee: Sumitomo Electric Industries, Ltd., Osaka-shi (JP)

( * ) Notice: Subject to any disclaimer, the term of this patent is extended or adjusted under 35 U.S.C. 154(b) by 0 days.

(21) Appl. No.: 15/556,530

(22) PCT Filed: Dec. 8, 2016

(86) PCT No.: PCT/JP2016/086644
§ 371 (c)(1),
(2) Date: Sep. 7, 2017

(87) PCT Pub. No.: WO2018/105092
PCT Pub. Date: Jun. 14, 2018

(65) Prior Publication Data
US 2018/0358632 A1    Dec. 13, 2018

(51) Int. Cl.
*H01M 8/0273* (2016.01)
*H01M 8/04186* (2016.01)
*H01M 8/18* (2006.01)
*H01M 8/2455* (2016.01)

(52) U.S. Cl.
CPC ..... *H01M 8/0273* (2013.01); *H01M 8/04186* (2013.01); *H01M 8/188* (2013.01); *H01M 8/2455* (2013.01)

(58) Field of Classification Search
None
See application file for complete search history.

(56) References Cited

FOREIGN PATENT DOCUMENTS

| JP | 2002-246061 A | 8/2002 |
|---|---|---|
| JP | 2005-228622 A | 8/2005 |
| JP | 2007-305339 A | 11/2007 |
| JP | 2013-080613 A | 5/2013 |
| WO | 2015/082614 A1 | 6/2015 |
| WO | 2016/072255 A1 | 5/2016 |

*Primary Examiner* — Sarah A. Slifka
(74) *Attorney, Agent, or Firm* — Venable LLP; Michael A. Sartori; Miguel A. Lopez

(57) ABSTRACT

A frame body, which is provided around a bipolar plate disposed between a positive electrode and a negative electrode of a redox flow battery, includes a positive electrode liquid supply slit and a positive electrode liquid discharge slit for supplying and discharging a positive electrode electrolyte to and from the positive electrode, the slits being provided on the one surface side of the frame body; and a negative electrode liquid supply slit and a negative electrode liquid discharge slit for supplying and discharging a negative electrode electrolyte to and from the negative electrode, the slits being provided on the other surface side of the frame body. At least one pair among a pair of inlets of the positive electrode liquid supply slit and the negative electrode liquid supply slit and a pair of outlets of the positive electrode liquid discharge slit and the negative electrode liquid discharge slit are provided so as to partly overlap each other in the thickness direction of the frame body.

7 Claims, 10 Drawing Sheets

FRAME BODY, CELL FRAME, CELL STACK, AND REDOX FLOW BATTERY

TECHNICAL FIELD

The present invention relates to a frame body, a cell frame, a cell stack, and a redox flow battery.

BACKGROUND ART

Redox flow batteries (hereinafter, may be referred to as "RF batteries") are known as one of large-capacity storage batteries (refer to Patent Literature 1 to 3). A redox flow battery includes a cell stack in which pluralities of cell frames, positive electrodes, membranes, and negative electrodes are stacked. A cell frame includes a bipolar plate disposed between a positive electrode and a negative electrode, and a frame body provided around the bipolar plate. In the cell stack, a positive electrode, a negative electrode, a membrane interposed therebetween are disposed between bipolar plates of two adjacent cell frames, thereby to constitute a cell. The RF battery performs charging and discharging by circulating a positive electrode electrolyte and a negative electrode electrolyte to positive electrodes and negative electrodes, respectively.

Patent Literature 1 to Patent Literature 3 each disclose a cell frame including a positive electrode electrolyte flow path which is provided on the one surface side of a frame body and through which a positive electrode electrolyte flows, and a negative electrode electrolyte flow path which is provided on the other surface side of the frame body and through which a negative electrode electrolyte flows. The positive electrode electrolyte flow path includes a positive electrode liquid supply slit for supplying the electrolyte to the electrode and a positive electrode discharge slit for discharging the electrolyte from the electrode, and the negative electrode electrolyte flow path includes a negative electrode liquid supply slit for supplying the electrolyte to the electrode and a negative electrode liquid discharge slit for discharging the electrolyte from the electrode. Furthermore, the frame body of the cell frame includes a positive electrode liquid supply manifold and a negative electrode liquid supply manifold through which the electrolytes to be supplied to the respective electrodes flow, and a positive electrode liquid discharge manifold and a negative electrode liquid discharge manifold through which the electrolytes discharged from the respective electrodes flow, the manifolds being provided so as to pass through the frame body.

CITATION LIST

Patent Literature

PTL 1: Japanese Unexamined Patent Application Publication No. 2013-80613
PTL 2: Japanese Unexamined Patent Application Publication No. 2002-246061
PTL 3: Japanese Unexamined Patent Application Publication No. 2005-228622

SUMMARY OF INVENTION

A frame body according to the present disclosure is provided around a bipolar plate which is disposed between a positive electrode and a negative electrode of a redox flow battery, the frame body including:

a positive electrode liquid supply manifold through which a positive electrode electrolyte to be supplied to the positive electrode flows, and a positive electrode liquid discharge manifold through which the positive electrode electrolyte discharged from the positive electrode flows, the manifolds being provided so as to pass through the frame body;

a positive electrode electrolyte flow path which is provided on the one surface side of the frame body and includes a positive electrode liquid supply slit for supplying the positive electrode electrolyte from the positive electrode liquid supply manifold to the positive electrode, the positive electrode liquid supply slit having an inlet which opens toward the inside of the frame body; and a positive electrode liquid discharge slit for discharging the positive electrode electrolyte from the positive electrode to the positive electrode liquid discharge manifold, the positive electrode liquid discharge slit having an outlet which opens toward the inside of the frame body;

a negative electrode liquid supply manifold through which a negative electrode electrolyte to be supplied to the negative electrode flows, and a negative electrode liquid discharge manifold through which the negative electrode electrolyte discharged from the negative electrode flows, the manifolds being provided so as to pass through the frame body; and a negative electrode electrolyte flow path which is provided on the other surface side of the frame body and includes a negative electrode liquid supply slit for supplying the negative electrode electrolyte from the negative electrode liquid supply manifold to the negative electrode, the negative electrode liquid supply slit having an inlet which opens toward the inside of the frame body; and a negative electrode liquid discharge slit for discharging the negative electrode electrolyte from the negative electrode to the negative electrode liquid discharge manifold, the negative electrode liquid discharge slit having an outlet which opens toward the inside of the frame body, wherein at least one pair among a pair of the inlets of the positive electrode liquid supply slit and the negative electrode liquid supply slit and a pair of the outlets of the positive electrode liquid discharge slit and the negative electrode liquid discharge slit are provided so as to partly overlap each other in the thickness direction of the frame body.

A cell frame according to the present disclosure includes the frame body according to the present disclosure and the bipolar plate provided inside the frame body.

A cell stack according to the present disclosure includes the cell frame according to the present disclosure.

Another cell stack according to the present disclosure includes a cell frame including a bipolar plate disposed between a positive electrode and a negative electrode of a redox flow battery, and a frame body provided around the bipolar plate, the frame body including:

a positive electrode liquid supply manifold through which a positive electrode electrolyte to be supplied to the positive electrode flows, and a positive electrode liquid discharge manifold through which the positive electrode electrolyte discharged from the positive electrode flows, the manifolds being provided so as to pass through the frame body;

a positive electrode electrolyte flow path which is provided on the one surface side of the frame body and includes a positive electrode liquid supply slit for supplying the positive electrode electrolyte from the positive electrode liquid supply manifold to the positive electrode, the positive electrode liquid supply slit having an inlet which opens toward the inside of the frame body; and a positive electrode liquid discharge slit for discharging the positive electrode electrolyte from the positive electrode to the positive electrode liquid discharge manifold, the positive electrode liquid discharge slit having an outlet which opens toward the inside of the frame body;

a negative electrode liquid supply manifold through which a negative electrode electrolyte to be supplied to the negative electrode flows, and a negative electrode liquid discharge manifold through which the negative electrode electrolyte discharged from the negative electrode flows, the manifolds being provided so as to pass through the frame body; and a negative electrode electrolyte flow path which is provided on the other surface side of the frame body and includes a negative electrode liquid supply slit for supplying the negative electrode electrolyte from the negative electrode liquid supply manifold to the negative electrode, the negative electrode liquid supply slit having an inlet which opens toward the inside of the frame body; and a negative electrode liquid discharge slit for discharging the negative electrode electrolyte from the negative electrode to the negative electrode liquid discharge manifold, the negative electrode liquid discharge slit having an outlet which opens toward the inside of the frame body, wherein both a pair of the inlets of the positive electrode liquid supply slit and the negative electrode liquid supply slit and a pair of the outlets of the positive electrode liquid discharge slit and the negative electrode liquid discharge slit are provided so as to overlap each other in the thickness direction of the frame body, and wherein, in a state where the cell frames are stacked, and the one surface side of the frame body of one of two adjacent cell frames faces the other surface side of the frame body of the other cell frame, the inlet of the positive electrode liquid supply slit and the outlet of the positive electrode liquid discharge slit provided on the one surface side of one frame body are disposed so as to partly overlap, in the stacking direction, the inlet of the negative electrode liquid supply slit and the outlet of the negative electrode liquid discharge slit provided on the other surface side of the other frame body, respectively.

A redox flow battery according to the present disclosure includes the cell stack according to the present disclosure.

DESCRIPTION OF EMBODIMENTS

Figure 1:
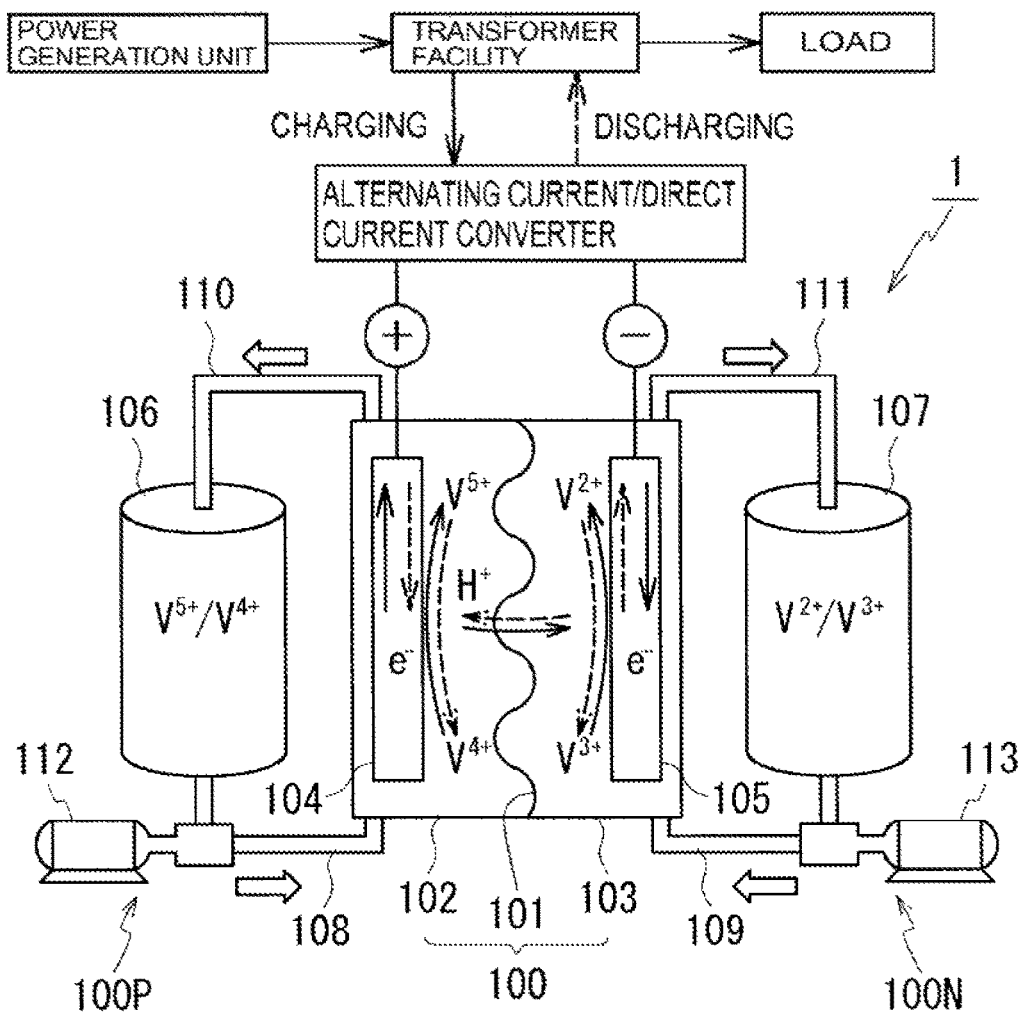
FIG. 1 is an operating principle diagram of a redox flow battery according to an embodiment.

Problems to be Solved by the Present Disclosure

Further improvement in the reliability and performance of redox flow batteries are desired.

In a frame body of a cell frame of an RF battery, when positive electrode and negative electrode slits (liquid supply slits and liquid discharge slits) constituting a positive electrode electrolyte flow path and a negative electrode electrolyte flow path are filled with charged electrolytes, shunt currents flow through the electrolytes in the slits, resulting in losses due to shunt currents (shunt current losses). The shut currents may cause the electrolytes to generate heat, and the temperatures of the electrolytes may increase. In some cases, a difference in temperature may occur between the positive electrode electrolyte and the negative electrode electrolyte. For example, during a standby period of the RF battery, since the electrolytes remain in the slits, the temperatures of the electrolytes are likely to increase in the slits compared with during operation when the electrolytes are circulated. When the temperatures of the electrolytes increase, precipitates may occur in the electrolytes, resulting in a decrease in the battery performance, such as degradation of the electrolytes. Furthermore, when a difference in temperature occurs between the positive electrode electrolyte and the negative electrode electrolyte, there is a possibility that deformation such as warpage may occur in the frame body, and there is a concern that the frame body (cell frame) may be damaged. Therefore, it is desired to suppress an increase in the temperatures of the positive and negative electrolytes while equalizing the temperatures of the electrolytes in the slits in which the positive and negative electrolytes are circulated.

Furthermore, in the case where cell frames are stacked to form a cell stack, the one surface side of the frame body of one of two adjacent cell frames faces the other surface side of the frame body of the other cell frame. Positive electrode slits constituting a positive electrode electrolyte flow path and negative electrode slits constituting a negative electrode electrolyte flow path are respectively provided on the one surface side (front surface side) and the other surface side (back surface side) of a frame body. When a cell stack is formed, positive electrode slits provided on the one surface side of one of two adjacent frame bodies face the other surface side of the other frame body, and negative electrode slits provided on the other surface side of the other frame body face the one surface side of the one frame body.

In existing frame bodies, positive electrode slits and negative electrode slits are generally formed in substantially the same pattern on the front and back surfaces of the frame bodies. Here, suppose a case where a cell stack is formed by using cell frames, in each of which an opening (inlet or outlet) which opens toward the inside of the frame body in a positive electrode slit and an opening which opens toward the inside of the frame body in a negative electrode slit are provided at the same position on the front and back surfaces (i.e. at positions overlapping each other in the thickness direction of the frame body). In this case, when a cell stack is formed, the opening of the positive electrode slit provided on the one surface side of one of two adjacent frame bodies faces the opening of the negative electrode slit provided on the other surface side of the other frame body. Since the openings face each other, contact pressure concentrates at corners of the openings, and there is a possibility that breakage such as cracking will occur, which may impair reliability. Furthermore, since contact pressure concentrates at corners of the openings, there is a possibility that membranes and the like interposed between adjacent frame bodies will be damaged.

Accordingly, it is an object of the present disclosure to provide a frame body, a cell frame, and a cell stack which can improve the reliability and performance of a redox flow battery. It is another object of the present disclosure to provide a redox flow battery which has high reliability and excellent battery performance.

Advantageous Effects of the Present Disclosure

In accordance with the present disclosure, it is possible to provide a frame body, a cell frame, and a cell stack which can improve the reliability and performance of a redox flow battery. Furthermore, in accordance with the present disclosure, it is possible to provide a redox flow battery which has high reliability and excellent battery performance.

DESCRIPTION OF EMBODIMENTS OF THE PRESENT INVENTION

First, the contents of embodiments of the present invention will be enumerated and described below.

(1) A frame body according to an embodiment is provided around a bipolar plate which is disposed between a positive electrode and a negative electrode of a redox flow battery, the frame body including:

a positive electrode liquid supply manifold through which a positive electrode electrolyte to be supplied to the positive electrode flows, and a positive electrode liquid discharge manifold through which the positive electrode electrolyte discharged from the positive electrode flows, the manifolds being provided so as to pass through the frame body;

a positive electrode electrolyte flow path which is provided on the one surface side of the frame body and includes a positive electrode liquid supply slit for supplying the positive electrode electrolyte from the positive electrode liquid supply manifold to the positive electrode, the positive electrode liquid supply slit having an inlet which opens toward the inside of the frame body; and a positive electrode liquid discharge slit for discharging the positive electrode electrolyte from the positive electrode to the positive electrode liquid discharge manifold, the positive electrode liquid discharge slit having an outlet which opens toward the inside of the frame body;

a negative electrode liquid supply manifold through which a negative electrode electrolyte to be supplied to the negative electrode flows, and a negative electrode liquid discharge manifold through which the negative electrode electrolyte discharged from the negative electrode flows, the manifolds being provided so as to pass through the frame body; and a negative electrode electrolyte flow path which is provided on the other surface side of the frame body and includes a negative electrode liquid supply slit for supplying the negative electrode electrolyte from the negative electrode liquid supply manifold to the negative electrode, the negative electrode liquid supply slit having an inlet which opens toward the inside of the frame body; and a negative electrode liquid discharge slit for discharging the negative electrode electrolyte from the negative electrode to the negative electrode liquid discharge manifold, the negative electrode liquid discharge slit having an outlet which opens toward the inside of the frame body, wherein at least one pair among a pair of the inlets of the positive electrode liquid supply slit and the negative electrode liquid supply slit and a pair of the outlets of the positive electrode liquid discharge slit and the negative electrode liquid discharge slit are provided so as to partly overlap each other in the thickness direction of the frame body.

In the frame body described above, at least one pair among a pair of the openings (inlets) of the positive electrode slit and the negative electrode slit and a pair of the openings (outlets) of the positive electrode slit and the negative electrode slit are provided so as to partly overlap each other in the thickness direction of the frame body. The expression "partly overlap each other in the thickness direction of the frame body" means, when viewed in perspective in the thickness direction of the frame body (the direction from one surface to the other surface), partly overlapping each other in the thickness direction and being shifted from each other in the circumferential direction of the frame body. Since at least one pair of the openings partly overlap each other in the thickness direction of the frame body, when a difference in temperature occurs between the positive electrode electrolyte and the negative electrode electrolyte flowing in the positive electrode slit and the negative electrode slit, heat conduction occurs from the higher-temperature electrolyte to the lower-temperature electrolyte, and the temperatures of the positive electrode electrolyte and the negative electrode electrolyte can be equalized. Furthermore, the higher-temperature electrolyte is cooled by heat conduction, and an increase in the temperatures of the electrolytes is suppressed. Therefore, precipitation of electrolyte components can be suppressed, and degradation of the electrolytes can be suppressed. Since a difference in temperature between the positive electrode electrolyte and the negative electrode electrolyte is unlikely to occur, deformation such as warpage is unlikely to occur in the frame body.

Furthermore, at least one pair among a pair of the openings (inlets) of the positive electrode slit and the negative electrode slit and a pair of the openings (outlets) of the positive electrode slit and the negative electrode slit are shifted from each other in the circumferential direction, when viewed in perspective in the thickness direction of the frame body. Therefore, when a cell stack is formed by stacking cell frames, each including the frame body described above, the openings of the frame bodies do not face one another. Accordingly, since it is possible to avoid concentration of contact pressure at corners of the openings, breakage such as cracking is unlikely to occur at the corners. Furthermore, by avoiding the concentration of contact pressure at corners of the openings, it is possible to suppress membranes and the like interposed between adjacent frame bodies from being damaged. Consequently, in the frame body, while equalizing the temperatures of the positive and negative electrolytes, it is possible to suppress an increase in the temperatures of the positive and negative electrolytes. When a cell stack is formed, it is possible to suppress breakage of the frame bodies and the like. Therefore, it is possible to improve the reliability and performance of a redox flow battery.

(2) In an example of the frame body, regarding at least one pair among the pair of the inlets of the positive electrode liquid supply slit and the negative electrode liquid supply slit and the pair of the outlets of the positive electrode liquid discharge slit and the negative electrode liquid discharge slit, the overlapping range in the thickness direction of the frame body may be 10% to 99% relative to the opening width thereof.

In at least one pair among a pair of the openings (inlets) of the positive electrode slit and the negative electrode slit and a pair of the openings (outlets) of the positive electrode slit and the negative electrode slit, when the overlapping range in which they overlap each other in the thickness direction of the frame body is 10% or more relative to the opening width thereof, heat conduction from the higher-temperature electrolyte to the lower-temperature electrolyte is easily ensured. Therefore, the temperatures of the positive electrode electrolyte and the negative electrode electrolyte can be effectively equalized, and also the cooling efficiency of the higher-temperature electrolyte can be enhanced, enabling further suppression in an increase in the temperatures of the electrolytes. Furthermore, when the overlapping range is 99% or less relative to the opening width thereof, it is possible to easily ensure that corners of openings are shifted from one another. Therefore, it is possible to effectively avoid concentration of contact pressure at corners of the openings, and it is possible to further suppress occurrence of breakage such as cracking at the corners or damage to the membranes and the like due to concentration of contact pressure. In the frame body, the lower limit of the overlapping range is preferably 20% or more, 30% or more, or 50% or more relative to the opening width thereof, and the upper limit is preferably 95% or less, or 90% or less relative to the opening width thereof.

(3) A cell frame according to an embodiment includes the frame body according to the item (1) or (2) and the bipolar plate provided inside the frame body.

In the cell frame, since the frame body according to the embodiment is provided, it is possible to improve the reliability and performance of a redox flow battery.

(4) A cell stack according to an embodiment includes the cell frame according to the item (3) described above.

In the cell stack, since the cell frame according to the embodiment is provided, it is possible to improve the reliability and performance of a redox flow battery.

(5) A cell stack according to another embodiment includes a cell frame including a bipolar plate disposed between a positive electrode and a negative electrode of a redox flow battery, and a frame body provided around the bipolar plate, the frame body including:

a positive electrode liquid supply manifold through which a positive electrode electrolyte to be supplied to the positive electrode flows, and a positive electrode liquid discharge manifold through which the positive electrode electrolyte discharged from the positive electrode flows, the manifolds being provided so as to pass through the frame body;

a positive electrode electrolyte flow path which is provided on the one surface side of the frame body and includes a positive electrode liquid supply slit for supplying the positive electrode electrolyte from the positive electrode liquid supply manifold to the positive electrode, the positive electrode liquid supply slit having an inlet which opens toward the inside of the frame body; and a positive electrode liquid discharge slit for discharging the positive electrode electrolyte from the positive electrode to the positive electrode liquid discharge manifold, the positive electrode liquid discharge slit having an outlet which opens toward the inside of the frame body;

a negative electrode liquid supply manifold through which a negative electrode electrolyte to be supplied to the negative electrode flows, and a negative electrode liquid discharge manifold through which the negative electrode electrolyte discharged from the negative electrode flows, the manifolds being provided so as to pass through the frame body; and a negative electrode electrolyte flow path which is provided on the other surface side of the frame body and includes a negative electrode liquid supply slit for supplying the negative electrode electrolyte from the negative electrode liquid supply manifold to the negative electrode, the negative electrode liquid supply slit having an inlet which opens toward the inside of the frame body; and a negative electrode liquid discharge slit for discharging the negative electrode electrolyte from the negative electrode to the negative electrode liquid discharge manifold, the negative electrode liquid discharge slit having an outlet which opens toward the inside of the frame body, wherein both a pair of the inlets of the positive electrode liquid supply slit and the negative electrode liquid supply slit and a pair of the outlets of the positive electrode liquid discharge slit and the negative electrode liquid discharge slit are provided so as to overlap each other in the thickness direction of the frame body, and wherein, in a state where the cell frames are stacked, and the one surface side of the frame body of one of two adjacent cell frames faces the other surface side of the frame body of the other cell frame, the inlet of the positive electrode liquid supply slit and the outlet of the positive electrode liquid discharge slit provided on the one surface side of one frame body are disposed so as to partly overlap, in the stacking direction, the inlet of the negative electrode liquid supply slit and the outlet of the negative electrode liquid discharge slit provided on the other surface side of the other frame body, respectively.

In the cell stack described above, in a frame body of a cell frame, both a pair of the openings (inlets) of the positive electrode liquid supply slit and the negative electrode liquid supply slit and a pair of the openings (outlets) of the positive electrode liquid discharge slit and the negative electrode liquid discharge slit are provided so as to overlap each other in the thickness direction of the frame body. The expression "overlap each other in the thickness direction of the frame body" means, when viewed in perspective in the thickness direction of the frame body (the direction from one surface to the other surface), being disposed at substantially the same location. For example, regarding the pairs of openings of the positive electrode slit and the negative electrode slit, the overlapping range in the thickness direction of the frame body may be more than 90% and 100% or less relative to the opening width thereof. Since the pairs of the openings overlap each other in the thickness direction of the frame body, when a difference in temperature occurs between the positive electrode electrolyte and the negative electrode electrolyte flowing in the positive electrode slit and the negative electrode slit, heat conduction occurs from the higher-temperature electrolyte to the lower-temperature electrolyte, and the temperatures of the positive electrode electrolyte and the negative electrode electrolyte can be equalized. Furthermore, the higher-temperature electrolyte is cooled by heat conduction, and an increase in the temperatures of the electrolytes is suppressed. Therefore, precipitation of electrolyte components can be suppressed, and degradation of the electrolytes can be suppressed. Since a difference in temperature between the positive electrode electrolyte and the negative electrode electrolyte is unlikely to occur, deformation such as warpage is unlikely to occur in the frame body. In the frame body of each of the cell frames constituting the cell stack, the lower limit of the overlapping range in the pairs of openings of the positive electrode slit and the negative electrode slit is preferably more than 95%, or more than 99% relative to the opening width thereof.

A cell stack is formed by stacking a plurality of cell frames, and the one surface side of the frame body of one of two adjacent cell frames faces the other surface side of the frame body of the other cell frame. In the cell stack, the openings (inlet and outlet) of the positive electrode slits provided on the one surface side of one of two adjacent frame bodies are disposed so as to partly overlap, in the stacking direction, the openings of the negative electrode slits provided on the other surface side of the other frame body. The expression "partly overlap each other in the stacking direction" means, when viewed in perspective in the stacking direction, partly overlapping each other in the stacking direction and being shifted from each other in the circumferential direction of the frame body. That is, in the frame bodies of two adjacent cell frames, when viewed in the stacking direction, the openings of the positive electrode slits of one of the frame bodies are shifted from the openings of the negative electrode slits of the other frame body in the circumferential direction. Therefore, the openings of the frame bodies do not face one another. Accordingly, since it is possible to avoid concentration of contact pressure at corners of the openings, breakage such as cracking is unlikely to occur at the corners. Furthermore, by avoiding the concentration of contact pressure at corners of the openings, it is possible to suppress membranes and the like interposed between adjacent frame bodies from being damaged. Consequently, in the cell stack, while equalizing the temperatures of the positive and negative electrolytes, it is possible to suppress an increase in the temperatures of the positive and negative electrolytes, and it is possible to suppress breakage of the frame bodies (cell frames) and the like. Therefore, it is possible to improve the reliability and performance of a redox flow battery. Regarding the openings of the positive electrode slits provided on the one surface side of one of two adjacent frame bodies and the openings of the negative electrode slits provided on the other surface side of the other frame body, the overlapping range in the stacking direction may be, for example, 10% to 99% relative to the opening width thereof. In the frame bodies of two adjacent cell frames, the lower limit of the overlapping range, in the stacking direction, in the openings of the positive electrode slits provided on the one surface side of one of the frame bodies and the openings of the negative electrode slits provided on the other surface side of the other frame body is preferably, 20% or more, 30% or more, or 50% or more, and the upper limit thereof is preferably 95% or less, or 90% or less.

(6) A redox flow battery according to an embodiment includes the cell stack according to the item (4) or (5).

In the redox flow battery, since the cell stack according to the embodiment is provided, high reliability and excellent battery performance can be achieved.

DETAILED DESCRIPTION OF EMBODIMENTS OF THE PRESENT INVENTION

Specific examples of a frame body, a cell frame, a cell stack, and a redox flow battery (RF battery) according to embodiments of the present invention will be described below with reference to the drawings. In the drawings, the same reference signs denote the same or equivalent components. The present invention is not limited to the examples, but the scope of the present invention is defined by the appended claims, and is intended to include all modifications within the meaning and scope equivalent to those of the claims.

<<RF Battery>>

An example of a redox flow battery (hereinafter, referred to as an "RF battery") according to an embodiment will be described with reference to FIGS. 1 and 2. An RF battery 1 uses a positive electrode electrolyte and a negative electrode electrolyte, each containing, as an active material, metal ions whose valence is changed by oxidation-reduction, and performs charging and discharging using the difference between the oxidation-reduction potential of ions contained in the positive electrode electrolyte and the oxidation-reduction potential of ions contained in the negative electrode electrolyte. The example of the RF battery 1 shown here is a vanadium-based RF battery which uses a vanadium electrolyte containing V ions serving as an active material for each of the positive electrode electrolyte and the negative electrode electrolyte. In a cell 100 shown in FIG. 1, solid line arrows indicate charging, and dashed line arrows indicate discharging. For example, the RF battery 1 is used for load leveling, for voltage sag compensation and emergency power sources, and for smoothing the output of natural energy, such as solar power generation or wind power generation that is being introduced on a massive scale.

The RF battery 1 includes a cell 100 which is separated into a positive electrode cell 102 and a negative electrode cell 103 by a membrane 101 that allows hydrogen ions to permeate therethrough. The positive electrode cell 102 contains a positive electrode 104 and is connected via ducts 108 and 110 to a positive electrode electrolyte tank 106 that stores a positive electrode electrolyte. The duct 108 is provided with a pump 112 for pressure-feeding the positive electrode electrolyte to the positive electrode cell 102, and the members 106, 108, 110, and 112 constitute a positive electrolyte circulation mechanism 100P for circulating the positive electrode electrolyte. Similarly, the negative electrode cell 103 contains a negative electrode 105 and is connected via ducts 109 and 111 to a negative electrode electrolyte tank 107 that stores a negative electrode electrolyte. The duct 109 is provided with a pump 113 for pressure-feeding the negative electrode electrolyte to the negative electrode cell 103, and the members 107, 109, 111, and 113 constitute a negative electrolyte circulation mechanism 100N for circulating the negative electrode electrolyte. The electrolytes stored in the tanks 106 and 107 are circulated within the cell 100 (positive electrode cell 102 and negative electrode cell 103) by the pumps 112 and 113 during operation in which charging and discharging are performed. During a standby period in which charging and discharging are not performed, the pumps 112 and 113 are stopped, and the electrolytes are not circulated.

<<Cell Stack>>

Figure 2:
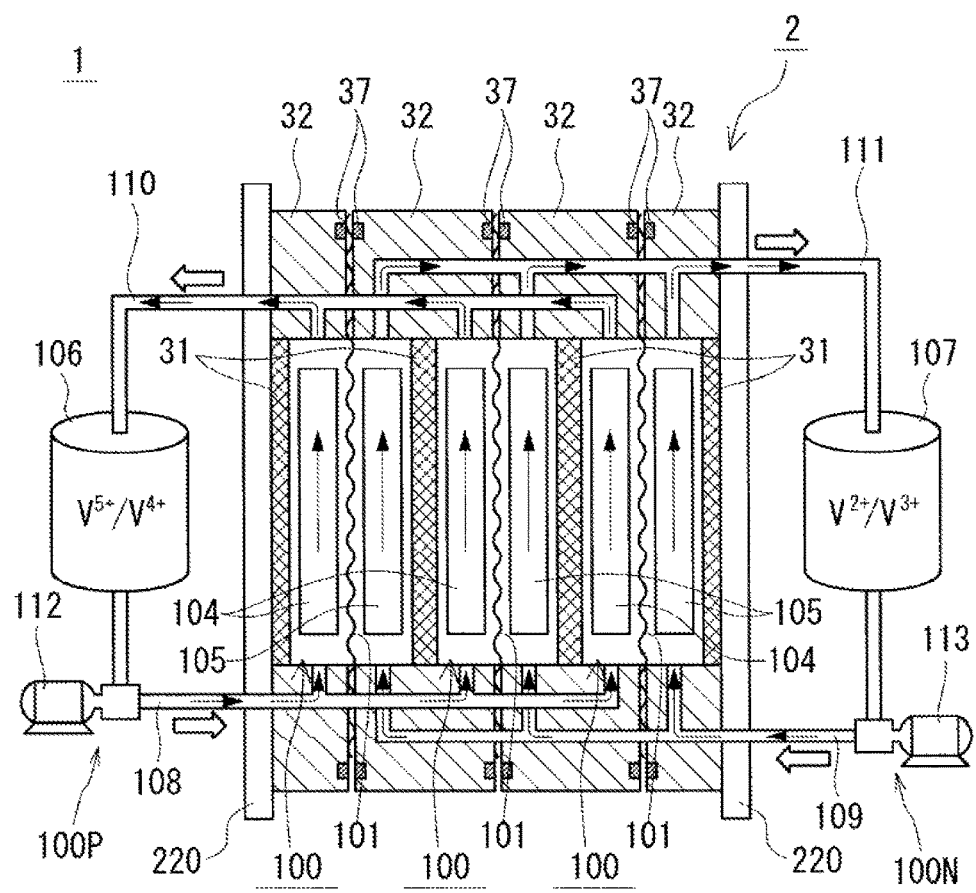
FIG. 2 is a schematic diagram of a redox flow battery according to an embodiment.
Figure 3:
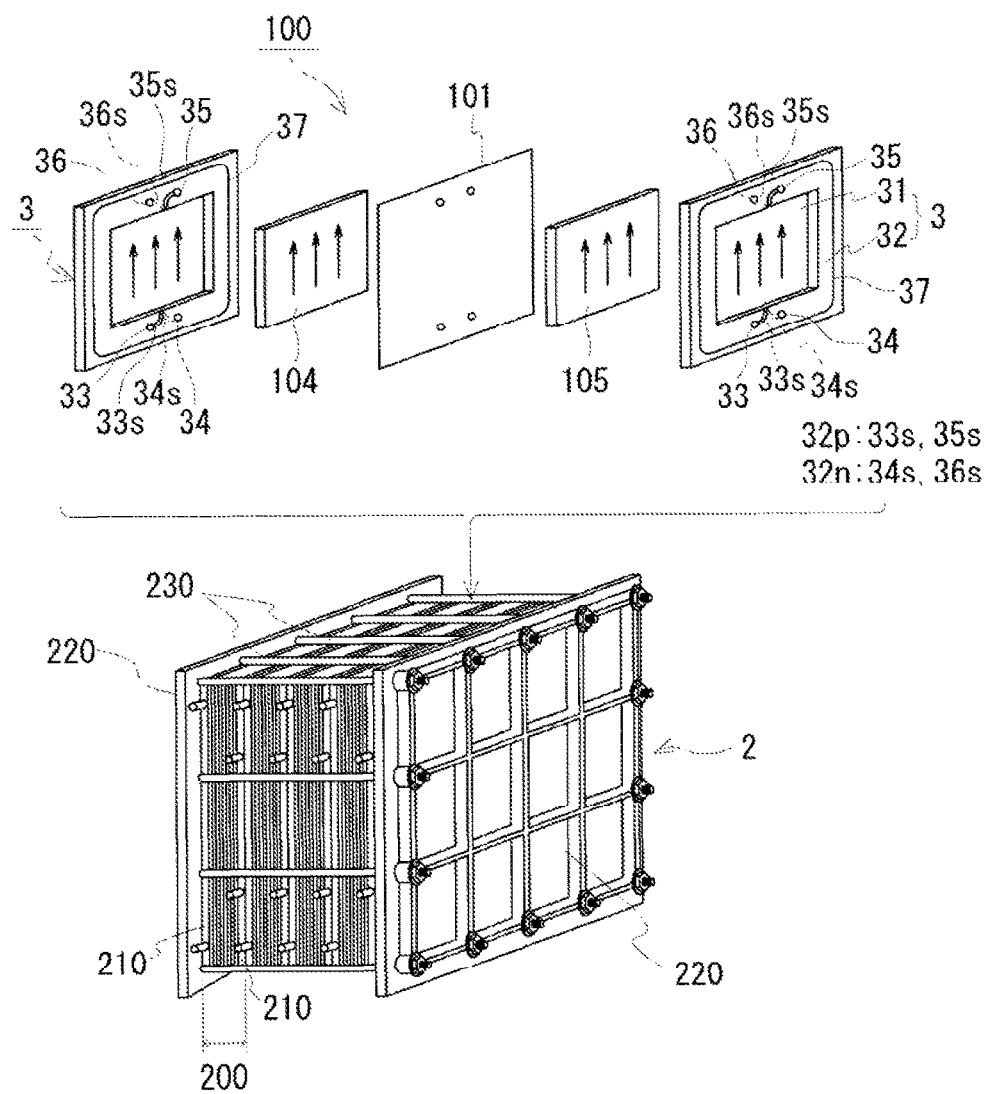
FIG. 3 is a schematic diagram of a cell stack according to an embodiment.

A cell 100 is usually formed inside a structure referred to as a cell stack 2, such as the one shown in FIG. 2 or 3. The cell stack 2 is configured such that a layered body referred to as a sub-stack 200 (refer to FIG. 3) is sandwiched between two end plates 220 and the end plates 220 on both sides are fastened with a fastening mechanism 230 (in the configuration shown in FIG. 3, a plurality of sub-stacks 200 are provided). The sub-stack 200 has a configuration in which pluralities of cell frames 3, positive electrodes 104, membranes 101, and negative electrodes 105 are stacked, and supply/discharge plates 210 (refer to the view shown in the lower part of FIG. 3; omitted in FIG. 2) are disposed on both ends of the layered body.

<<Cell Frame>>

As shown in FIGS. 2 and 3, a cell frame 3 includes a bipolar plate 31 which is disposed between a positive electrode 104 and a negative electrode 105, and a frame body 32 which is provided around the bipolar plate 31. The positive electrode 104 is disposed so as to be in contact with the one surface side of the bipolar plate 31, and the negative electrode 105 is disposed so as to be in contact with the other surface side of the bipolar plate 31. The bipolar plate 31 is provided inside the frame body 32, and the positive electrode 104 and the negative electrode 105 are placed with the bipolar plate 31 therebetween inside the frame body 32. In the sub-stack 200 (cell stack 2), a cell 100 is formed between bipolar plates 31 of two adjacent cell frames 3. The one surface side of the frame body 32 of one of two adjacent cell frames 3 faces the other surface side of the frame body 32 of the other cell frame 3.

The bipolar plate 31 is, for example, made of plastic carbon or the like, and the frame body 32 is, for example, made of a plastic, such as a vinyl chloride resin (PVC), polypropylene, polyethylene, a fluorine resin, or an epoxy resin. The bipolar plate 31 is formed by a known method, such as injection molding, press molding, or vacuum forming. In the cell frame 3, the frame body 32 is integrated around the bipolar plate 31 by injection molding or the like.

<<Frame Body>>

A frame body 32 includes liquid supply manifolds 33 and 34 through which a positive electrode electrolyte and a negative electrode electrolyte to be supplied to the positive electrode 104 and the negative electrode 105 flow, and liquid discharge manifolds 35 and 36 through which the electrolytes discharged from the electrodes flow. Furthermore, the frame body 32 includes liquid supply slits 33s and 34s for supplying the electrolytes from the liquid supply manifolds 33 and 34 to the respective electrodes, and liquid discharge slits 35s and 36s for discharging the electrolytes from the electrodes to the liquid discharge manifolds 35 and 36. The positive and negative electrode electrolytes are made to flow to the positive electrode 104 and the negative electrode 105 through the supply/discharge plates 210 (refer to the view shown in the lower part of FIG. 3) by means of the liquid supply manifolds 33 and 34 and the liquid discharge manifolds 35 and 36 provided so as to pass through the frame body 32 shown in FIG. 3, and the liquid supply slit 33s and the liquid discharge slit 35s provided on the one surface side of the frame body 32 and the liquid supply slit 34s and the liquid discharge slit 36s provided on the other surface side of the frame body 32 (refer also to FIGS. 4 and 5).

In this example, the liquid supply manifold 33 and the liquid discharge manifold 35 are manifolds through which the positive electrode electrolyte flows. Specifically, the liquid supply manifold 33 is a positive electrode liquid supply manifold through which the positive electrode electrolyte to be supplied to the positive electrode 104 flows, and the liquid discharge manifold 35 is a positive electrode liquid discharge manifold through which the positive electrode electrolyte discharged from the positive electrode 104 flows. On the other hand, the liquid supply manifold 34 and the liquid discharge manifold 36 are manifolds through which the negative electrode electrolyte flows. Specifically, the liquid supply manifold 34 is a negative electrode liquid supply manifold through which the negative electrode electrolyte to be supplied to the negative electrode 105 flows, and the liquid discharge manifold 36 is a negative electrode liquid discharge manifold through which the negative electrode electrolyte discharged from the negative electrode 105 flows.

Figure 4:
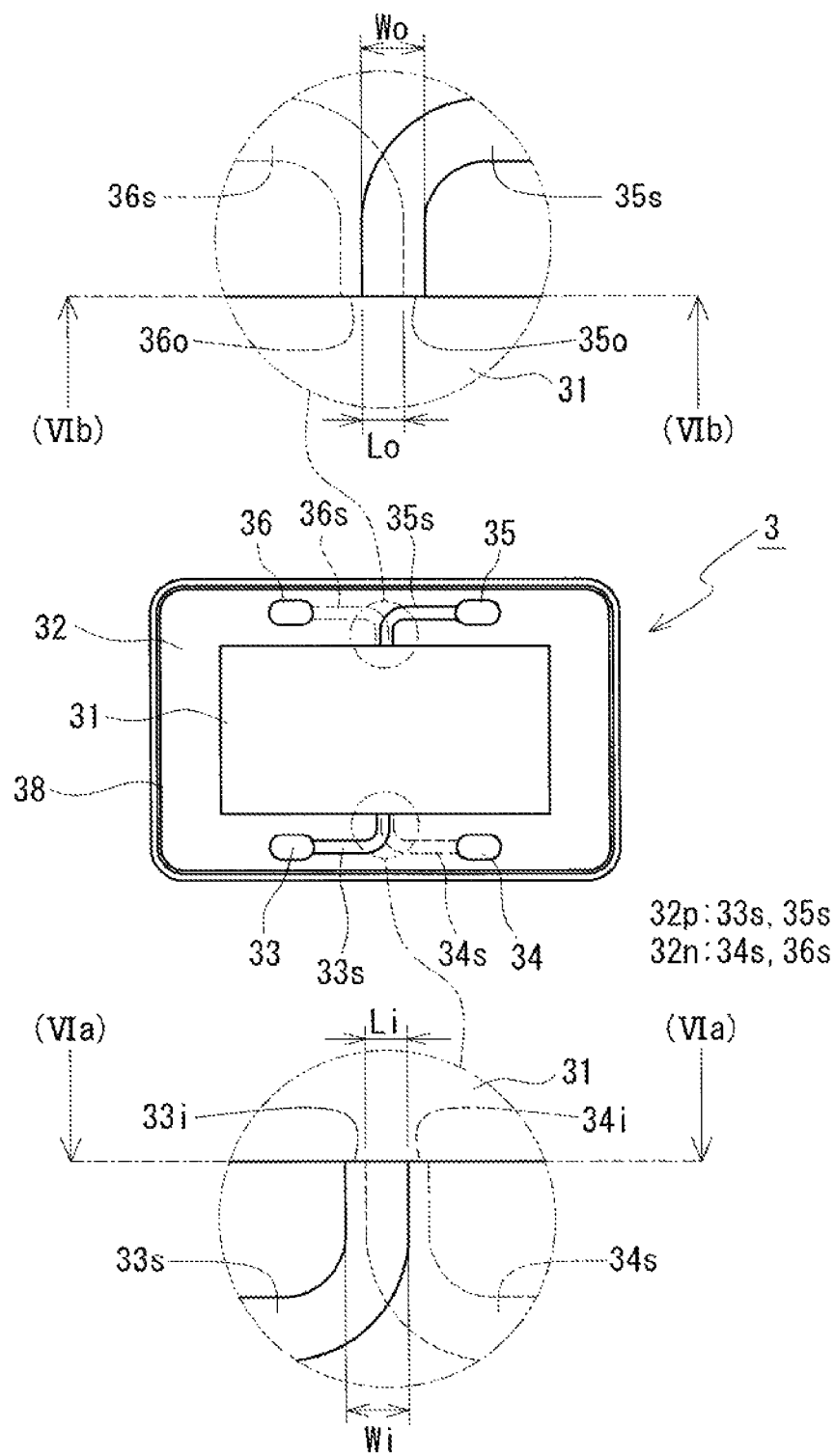
FIG. 4 is a schematic plan view of a cell frame according to Embodiment 1, viewed from the one surface side thereof.
Figure 5:
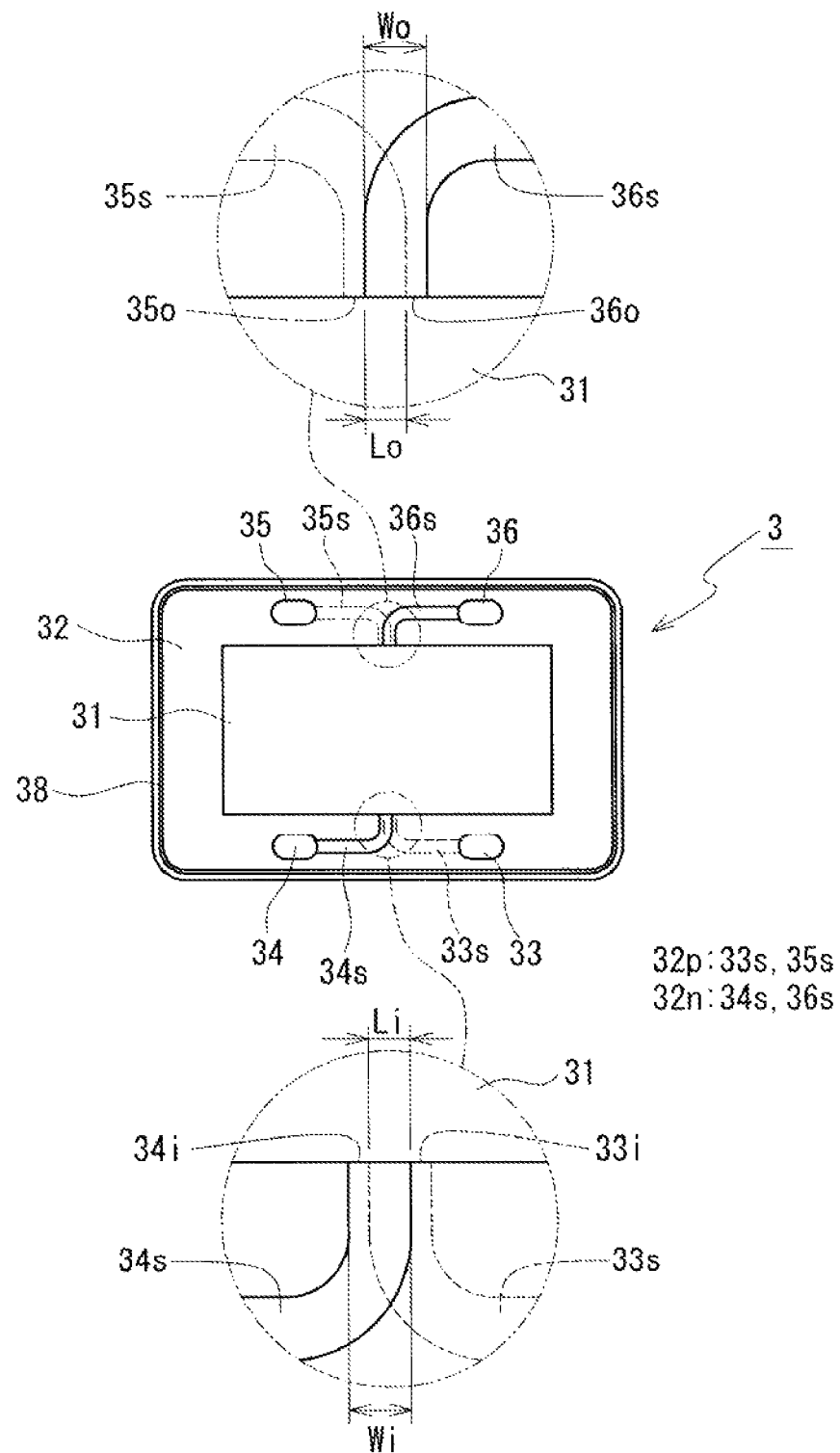
FIG. 5 is a schematic plan view of the cell frame according to Embodiment 1, viewed from the other surface side thereof.

Furthermore, a liquid supply slit 33s and a liquid discharge slit 35s provided on the one surface side (front surface side) of the frame body 32 shown in FIG. 4 are slits constituting a positive electrode electrolyte flow path 32p. Specifically, the liquid supply slit 33s is a positive electrode liquid supply slit for supplying the positive electrode electrolyte from the positive electrode liquid supply manifold 33 to the positive electrode 104, and the liquid discharge slit 35s is a positive electrode liquid discharge slit for discharging the positive electrode electrolyte from the positive electrode 104 to the positive electrode liquid discharge manifold 35. The positive electrode liquid supply slit 33s has an inlet 33i which opens toward the inside of the frame body 32, and the positive electrode liquid discharge slit 35s has an outlet 35o which opens toward the inside of the frame body 32. On the other hand, a liquid supply slit 34s and a liquid discharge slit 36s provided on the other surface side (back surface side) of the frame body 32 shown in FIG. 5 are slits constituting a negative electrode electrolyte flow path 32n. Specifically, the liquid supply slit 34s is a negative electrode liquid supply slit for supplying the negative electrode electrolyte from the negative electrode liquid supply manifold 34 to the negative electrode 105, and the liquid discharge slit 35s is a negative electrode liquid discharge slit for discharging the negative electrode electrolyte from the negative electrode 105 to the negative electrode liquid discharge manifold 36. The negative electrode liquid supply slit 34s has an inlet 34i which opens toward the inside of the frame body 32, and the negative electrode liquid discharge slit 36s has an outlet 36o which opens toward the inside of the frame body 32. The positive electrode liquid supply slit 33s and the negative electrode liquid supply slit 34s have substantially the same slit shape, length, width, and depth, and the positive electrode liquid discharge slit 35s and the negative electrode liquid discharge slit 36s have substantially the same slit shape, length, width, and depth.

The depth of each slit may be, for example, 0.5 to 10 mm, or 1.0 to 5.0 mm, and may satisfy a range of 10% to 45% of the thickness of the frame body 32 from the viewpoint of ensuring the mechanical strength of the frame body 32. The width of each slit may be, for example, 0.5 to 20 mm, or 1.0 to 8.0 mm. In this example, the cross-sectional shape orthogonal to the longitudinal direction of each slit is rectangular. However, the cross-sectional shape of each slit is not limited thereto, and may be, for example, triangular, trapezoidal, semicircular, or semi-elliptic.

In the case of the frame body 32 (cell frame 3) in this example, as shown in FIG. 4, the positive electrode electrolyte is supplied from the liquid supply manifold 33 through the liquid supply slit 33s formed on the lower part of the frame body 32 to the positive electrode 104 (refer to FIG. 3), and is discharged through the liquid discharge slit 35s formed on the upper part of the frame body 32 to the liquid discharge manifold 35. Similarly, as shown in FIG. 5, the negative electrode electrolyte is supplied from the liquid supply manifold 34 through the liquid supply slit 34s formed on the lower part of the frame body 32 to the negative electrode 105 (refer to FIG. 3), and is discharged through the liquid discharge slit 36s formed on the upper part of the frame body 32 to the liquid discharge manifold 36. Rectifying portions (not shown) may be formed along an inner lower edge and an inner upper edge of the frame body 32. The rectifying portions function to diffuse the electrolytes supplied from the liquid supply slits 33s and 34s along the lower edges of the electrodes and to collect the electrolytes discharged from the upper edges of the electrodes to the liquid discharge slits 35s and 36s.

In addition, ring-shaped sealing members 37, such as O-rings and flat packings, (refer to FIGS. 2 and 3) are disposed between the frame bodies 32 of the cell frames 3 so that leakage of the electrolytes can be suppressed. The frame body 32 is provided with sealing grooves 38 (refer to FIGS. 4 and 5) for disposing the sealing members 37.

Embodiment 1

One of the characteristics of the frame body 32 according to the embodiment is that at least one pair among a pair of the inlets 33i and 34i of the positive electrode liquid supply slit 33s and the negative electrode liquid supply slit 34s and a pair of the outlets 35o and 36o of the positive electrode liquid discharge slit 35s and the negative electrode liquid discharge slit 36s are provided so as to partly overlap each other in the thickness direction of the frame body 32. A detailed description will be made below, with reference to FIGS. 4 to 8, regarding the frame body 32 (cell frame 3) according to Embodiment 1, and a cell stack 2 including the cell frame 3.

Figure 6A:
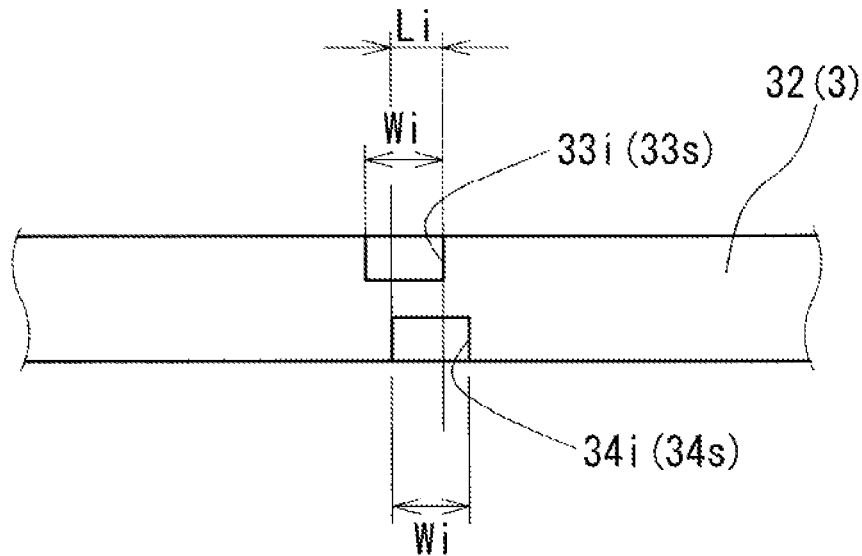
FIG. 6A is a cross-sectional view taken along the line VIa-VIa of FIG. 4.
Figure 6B:
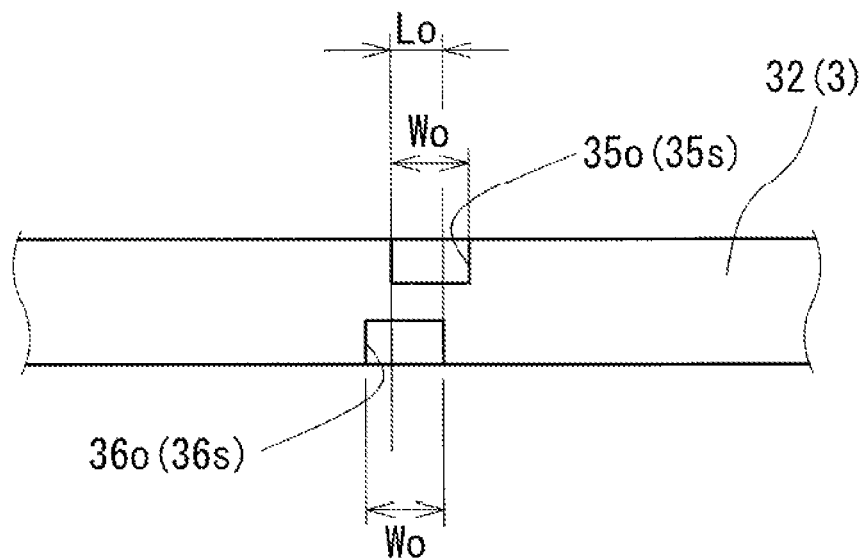
FIG. 6B is a cross-sectional view taken along the line VIb-VIb of FIG. 4.

In the frame body 32 of the cell fame 3 shown in FIGS. 4 and 5, as shown in FIG. 6A, the inlet 33i of the positive electrode liquid supply slit 33s and the inlet 34i of the negative electrode liquid supply slit 34s are located so as to partly overlap each other in the thickness direction of the frame body 32. Furthermore, in the frame body 32 of the cell fame 3, as shown in FIG. 6B, the outlet 35o of the positive electrode liquid discharge slit 35s and the outlet 36o of the negative electrode liquid discharge slit 36s of the frame body 32 are located so as to partly overlap each other in the thickness direction of the frame body 32. Consequently, in the cell frame 3 according to Embodiment 1, a pair of the inlets 33i and 34i and a pair of the outlets 35o and 36o are each provided so as to partly overlap each other in the thickness direction of the frame body 32.

As shown in FIG. 6A, since the pair of the inlets 33i and 34i partly overlap each other in the thickness direction of the frame body 32, heat conduction is efficiently performed between the positive electrode electrolyte flowing in the positive electrode liquid supply slit 33s and the negative electrode electrolyte flowing in the negative electrode liquid supply slit 34s. On the other hand, as shown in FIG. 6B, since the pair of the outlets 35o and 36o partly overlap each other in the thickness direction of the frame body 32, heat conduction is efficiently performed between the positive electrode electrolyte flowing in positive electrode liquid discharge slit 35s and the negative electrode electrolyte flowing in the negative electrode liquid discharge slit 36s. Accordingly, when a difference in temperature occurs between the positive electrode electrolyte and the negative electrode electrolyte, heat conduction occurs from the higher-temperature electrolyte to the lower-temperature electrolyte, and while equalizing the temperatures of the electrolytes, it is possible to suppress an increase in the temperatures of the electrolytes.

Figure 7A:
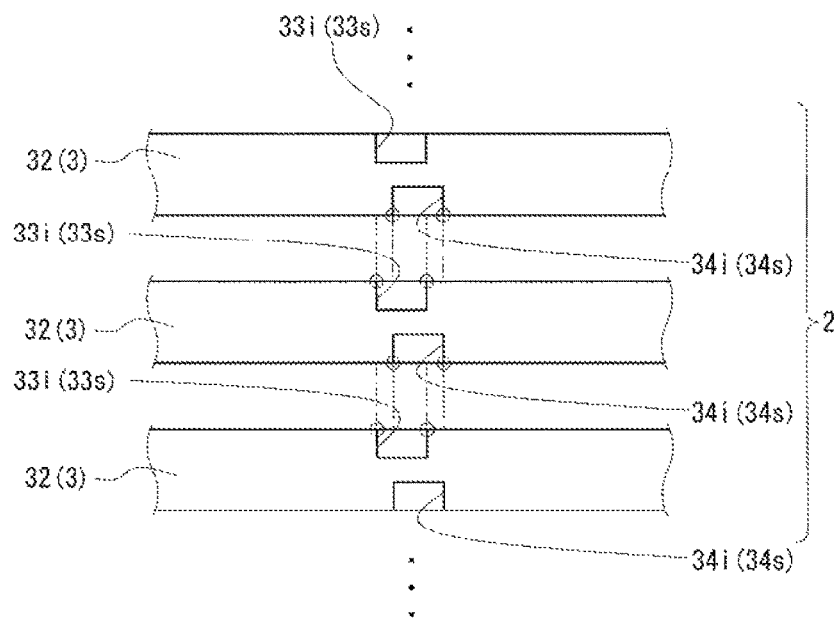
FIG. 7A is a schematic diagram showing the positional relationship between an inlet of a positive electrode liquid supply slit and an inlet of a negative electrode liquid supply slit when cell frames according to Embodiment 1 are stacked.
Figure 7B:
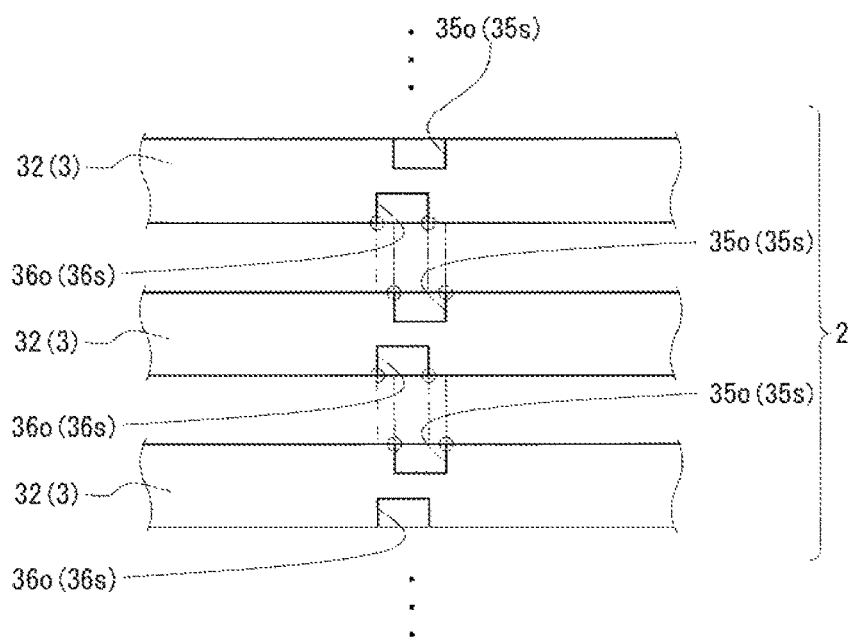
FIG. 7B is a schematic diagram showing the positional relationship between an outlet of a positive electrode liquid discharge slit and an outlet of a negative electrode liquid discharge slit when cell frames according to Embodiment 1 are stacked.

When a cell stack 2 (refer to FIGS. 2 and 3) is formed by using cell frames 3, as shown in FIGS. 7A and 7B, the one surface side of the frame body 32 of one of two adjacent cell frames 3 faces the other surface side of the frame body 32 of the other cell frame 3. Since a pair of the inlets 33i and 34i are shifted from each other in the circumferential direction, when viewed in the thickness direction of the frame body 32, as shown in FIG. 7A, the corners of the inlets 33i and 34i (portions surrounded by circles in FIG. 7A) do not face one another. Therefore, it is possible to avoid concentration of contact pressure at the corners of the inlets 33i and 34i. On the other hand, since a pair of the outlets 35o and 36o are shifted from each other in the circumferential direction, when viewed in the thickness direction of the frame body 32, as shown in FIG. 7B, the corners of the outlets 35o and 36o (portions surrounded by circles in FIG. 7B) do not face one another. Therefore, it is possible to avoid concentration of contact pressure at the corners of the outlets 35o and 36o. Accordingly, when the cell frames 3 are stacked, breakage such as cracking is unlikely to occur at the corners of the openings (inlets 33i and 34i and outlets 35o and 36o) in the slits 33s to 36s for positive and negative electrodes.

In the pair of the inlets 33i and 34i shown in FIG. 6A, when the opening width thereof is denoted by Wi, the overlapping range Li in the thickness direction of the frame body 32 is 10% to 99% relative to the opening width Wi. Furthermore, in the pair of the outlets 35o and 36o shown in FIG. 6B, when the opening width thereof is denoted by Wo, the overlapping range Lo in the thickness direction of the frame body 32 is 10% to 99% relative to the opening width Wo. The overlapping range Li between the pair of the inlets 33i and 34i and the overlapping range Lo between the pair of the outlets 35o and 36o are respectively represented by $0.1Wi \leq Li \leq 0.99Wi$ and $0.1Wo \leq Lo \leq 0.99Wo$. When the overlapping range Li (Lo) satisfies 10% or more of the opening width Wi (Wo), in the inlets 33i and 34i of the liquid supply slits 33s and 34s (the outlets 35o and 36o of the liquid discharge slits 35s and 36s) for the positive and negative electrodes, heat conduction from the higher-temperature electrolyte to the lower-temperature electrolyte is easily ensured. Therefore, the temperatures of the positive electrode electrolyte and the negative electrode electrolyte can be effectively equalized, and also the cooling efficiency of the higher-temperature electrolyte can be enhanced, enabling further suppression in an increase in the temperatures of the electrolytes. When the overlapping range Li (Lo) satisfies 99% or less of the opening width Wi (Wo), it is possible to easily ensure that the corners of the inlets 33i and 34i (outlets 35o and 36o) are shifted from one another, and it is possible to effectively suppress occurrence of breakage at the corners due to concentration of contact pressure. In this embodiment, the overlapping ranges Li and Lo are each preferably 20% or more, 30% or more, or 50% or more of the opening width Wi or Wo and preferably 95% or less, or 90% or less of the opening width Wi or Wo.

{Operational Advantages}

The frame body 32 according to Embodiment 1 has the following operational advantages.

Since the pair of the inlets 33i and 34i and the pair of the outlets 35o and 36o each partly overlap each other in the thickness direction of the frame body 32, when a difference in temperature occurs between the positive electrode electrolyte and the negative electrode electrolyte, heat conduction occurs from the higher-temperature electrolyte to the lower-temperature electrolyte, and the temperatures of the positive electrode electrolyte and the negative electrode electrolyte can be equalized. The higher-temperature electrolyte is cooled by heat conduction, and an increase in the temperatures of the electrolytes is suppressed. Therefore, precipitation of electrolyte components can be suppressed, and degradation of the electrolytes can be suppressed. Furthermore, since a difference in temperature between the positive electrode electrolyte and the negative electrode electrolyte is unlikely to occur, deformation such as warpage is unlikely to occur in the frame body 32.

Furthermore, since the pair of the inlets 33i and 34i and the pair of the outlets 35o and 36o each are shifted from each other in the circumferential direction, when viewed in the thickness direction of the frame body 32, when cell frames 3 are stacked, it is possible to avoid a situation where inlets 33i and 34i of two adjacent frame bodies 32 and outlets 35o and 36o of two adjacent frame bodies 32 each face one another. Accordingly, since it is possible to avoid concentration of contact pressure at corners of the inlets 33i and 34i and the outlets 35o and 36o, breakage such as cracking is unlikely to occur at the corners. Furthermore, by avoiding the concentration of contact pressure at the corners, it is possible to suppress membranes 101 interposed between adjacent frame bodies 32 from being damaged. Consequently, in the cell frame 3, while equalizing the temperatures of the positive and negative electrolytes, it is possible to suppress an increase in the temperatures of the positive and negative electrolytes. When a cell stack 2 is formed, it is possible to suppress breakage of the frame bodies 32. Therefore, it is possible to improve the reliability and performance of an RF battery 1.

In Embodiment 1, an example has been described in which the pair of the inlets 33i and 34i and the pair of the outlets 35o and 36o are each provided so as to partly overlap each other in the thickness direction of the frame body 32. However, the embodiment is not limited thereto. The pair of the inlets 33i and 34i alone may be provided so as to partly overlap each other, or the pair of the outlets 35o and 36o alone may be provided so as to partly overlap each other.

Embodiment 2

Figure 8:
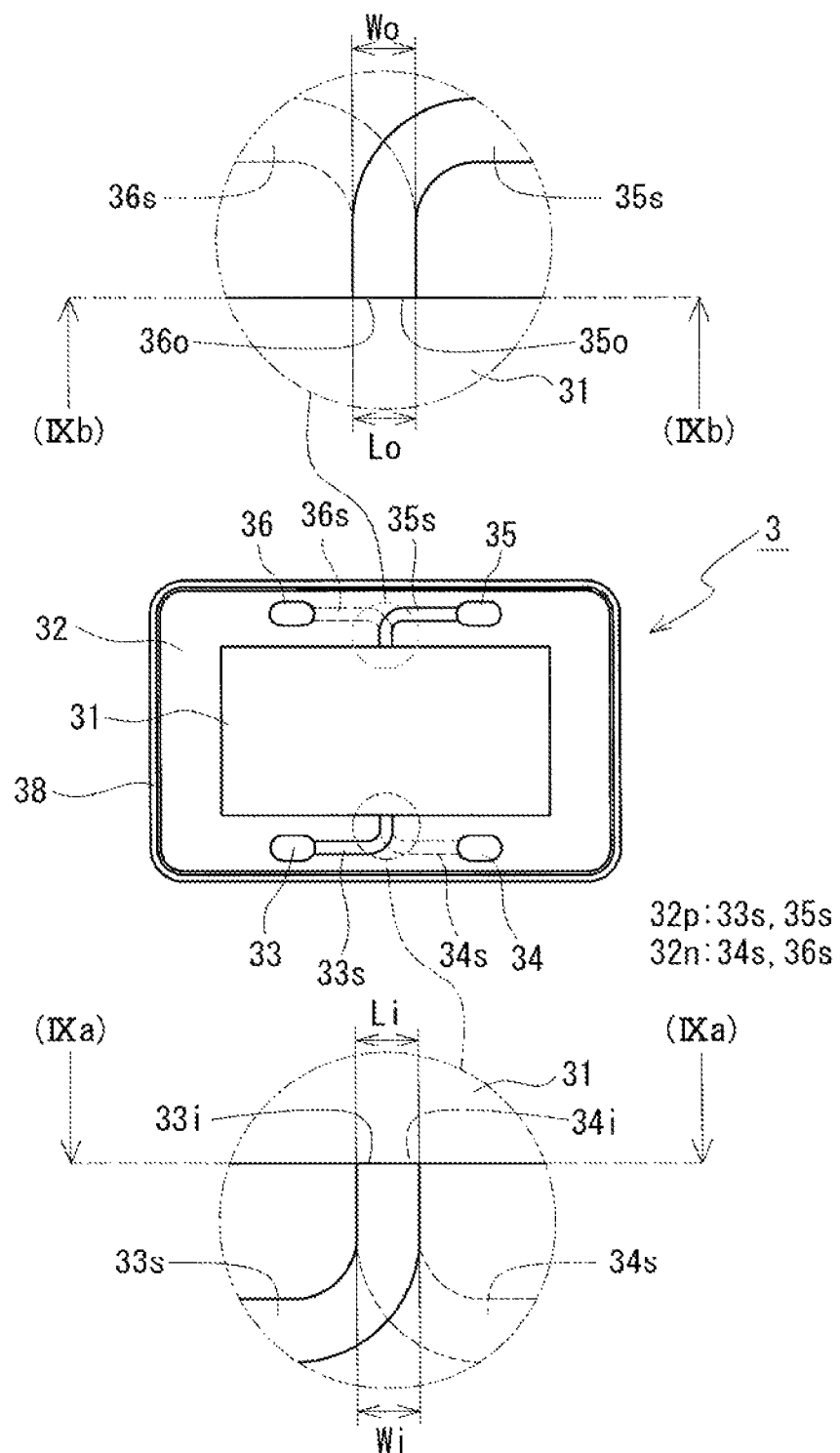
FIG. 8 is a schematic plan view of a cell frame in a cell stack according to Embodiment 2, viewed from the one surface side thereof.

A description will be made, with reference to FIGS. 8 to 10, regarding a cell stack 2 according to another embodiment. A description will made below, focusing on differences from Embodiment 1, and a description of the same content as that of Embodiment 1 will be omitted. One of the characteristics of the cell stack 2 according to Embodiment 2 is that, as shown in FIGS. 8 and 9, in the frame body 32 of each of the cell frames 3 constituting the cell stack 2, both a pair of the inlets 33i and 34i of the positive electrode liquid supply slit 33s and the negative electrode liquid supply slit 34s and a pair of the outlets 35o and 36o of the positive electrode liquid discharge slit 35s and the negative electrode liquid discharge slit 36s are provided so as to overlap each other in the thickness direction of the frame body 32. Another of the characteristics of the cell stack 2 is that, as shown in FIGS. 10A and 10B, in two adjacent cell frames 3, the inlet 33i of the positive electrode liquid supply slit 33s and the outlet 35o of the positive electrode liquid discharge slit 35s provided on the one surface side of one frame body 32 are disposed so as to partly overlap, in the stacking direction, the inlet 34i of the negative electrode liquid supply slit 34s and the outlet 36o of the negative electrode liquid discharge slit 36s provided on the other surface side of the other frame body 32.

Figure 9A:
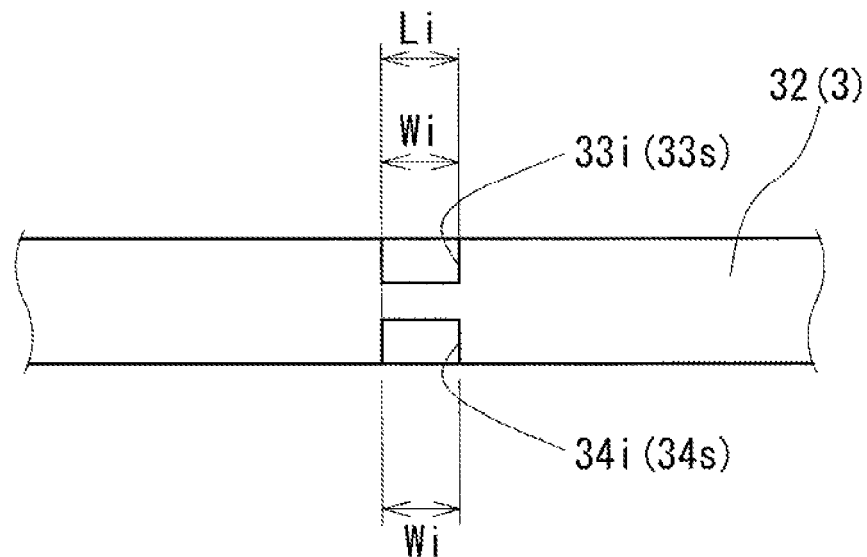
FIG. 9A is a cross-sectional view taken along the line IXa-IXa of FIG. 8.
Figure 9B:
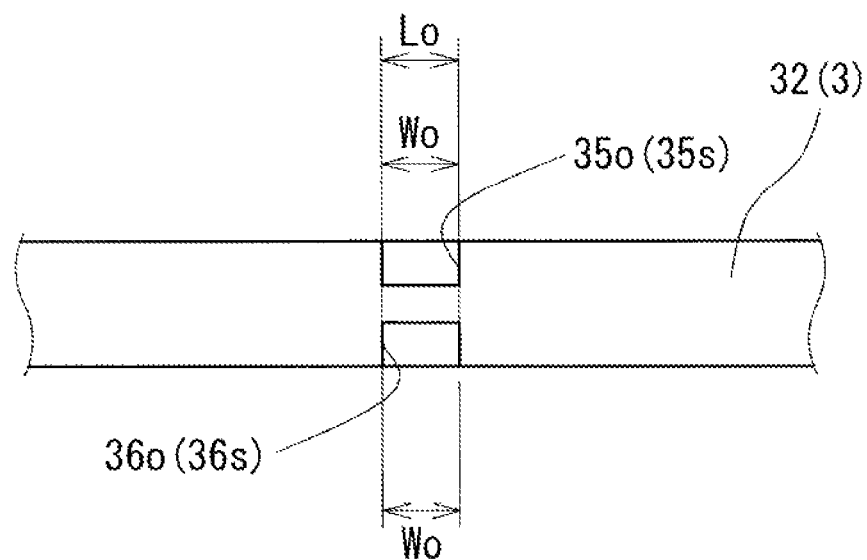
FIG. 9B is a cross-sectional view taken along the line IXb-IXb of FIG. 8.
Figure 10A:
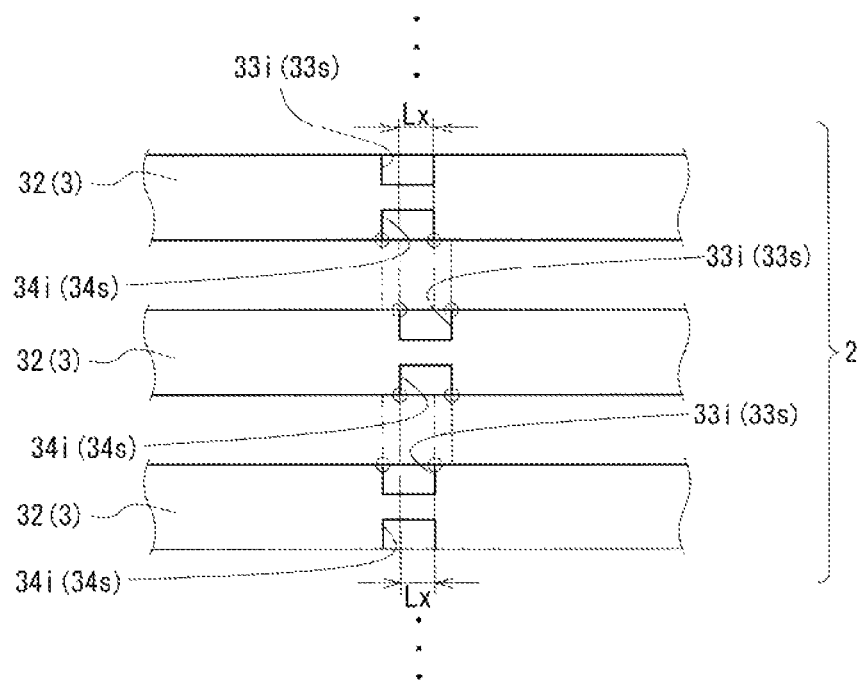
FIG. 10A is a schematic diagram showing the positional relationship between an inlet of a positive electrode liquid supply slit and an inlet of a negative electrode liquid supply slit of two adjacent cell frames in the cell stack according to Embodiment 2.
Figure 10B:
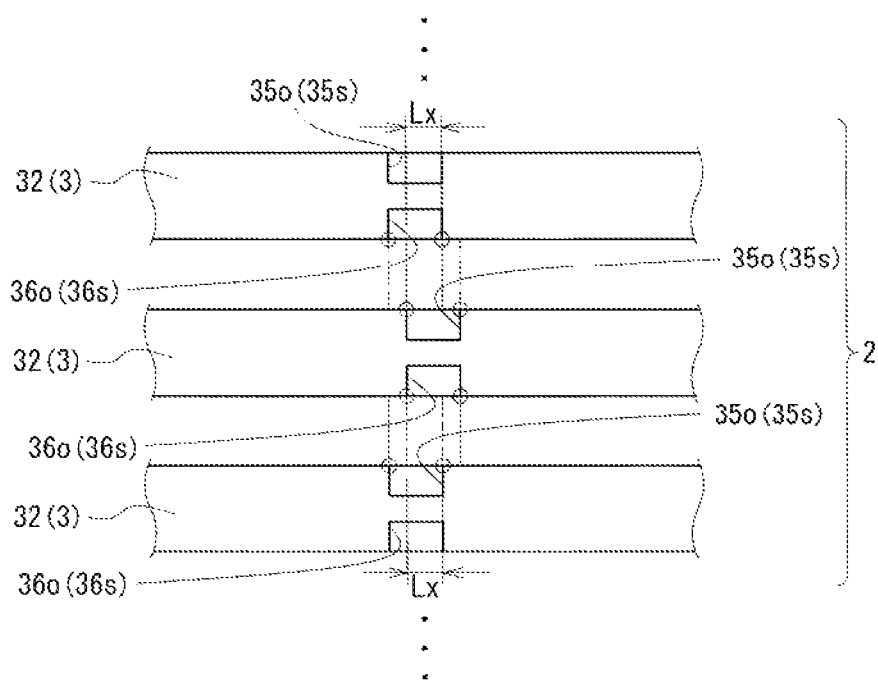
FIG. 10B is a schematic diagram showing the positional relationship between an outlet of a positive electrode liquid discharge slit and an outlet of a negative electrode liquid discharge slit of two adjacent cell frames in the cell stack according to Embodiment 2.

In the cell stack 2 according to Embodiment 2, as shown in FIGS. 8 and 9A, in a frame body 32 of a cell frame 3, the inlet 33i of the positive electrode liquid supply slit 33s and the inlet 34i of the negative electrode liquid supply slit 34s are located so as to overlap each other in the thickness direction of the frame body 32. Furthermore, as shown in FIGS. 8 and 9B, in the frame body 32, the outlet 35o of the positive electrode liquid discharge slit 35s and the outlet 36o of the negative electrode liquid discharge slit 36s are located so as to overlap each other in the thickness direction of the frame body 32. Consequently, in the cell frame 3 (frame body 32) in the cell stack 2 of Embodiment 2, both a pair of the inlets 33i and 34i and a pair of the outlets 35o and 36o are provided so as to overlap each other in the thickness direction of the frame body 32.

As shown in FIG. 9A, since the pair of the inlets 33i and 34i overlap each other in the thickness direction of the frame body 32, heat conduction efficiently occurs between the positive electrode electrolyte flowing through the positive electrode liquid supply slit 33s and the negative electrode electrolyte flowing through the negative electrode liquid supply slit 34s. On the other hand, as shown in FIG. 9B, since the pair of the outlets 35o and 36o overlap each other in the thickness direction of the frame body 32, heat conduction efficiently occurs between the positive electrode electrolyte flowing through the positive electrode liquid discharge slit 35s and the negative electrode electrolyte flowing through the negative electrode liquid discharge slit 36s. Consequently, when a difference in temperature occurs between the positive electrode electrolyte and the negative electrode electrolyte, heat conduction occurs from the higher-temperature electrolyte to the lower-temperature electrolyte. While equalizing the temperatures of the positive electrode electrolyte and the negative electrode electrolyte, an increase in the temperatures of the electrolytes can be suppressed.

As shown in FIG. 8, when viewed in perspective in the thickness direction of the frame body 32, both the pair of the inlets 33i and 34i and the pair of the outlets 35o and 36o are provided so as to overlap each other at substantially the same location. In the pairs of the inlets 33i and 34i shown in FIG. 9A, for example, the overlapping range Li in the thickness direction of the frame body 32 may be more than 90% and 100% or less relative to the opening width Wi thereof. Furthermore, in the pairs of the outlets 35o and 36o shown in FIG. 9B, for example, the overlapping range Lo in the thickness direction of the frame body 32 may be more than 90% and 100% or less relative to the opening width Wo thereof. In this example, the overlapping ranges Li and Lo are equal to the opening widths Wi and Wo, respectively (Li=Wi, Lo=Wo). In this embodiment, preferably, the overlapping ranges Li and Lo are more than 95%, or more than 99% relative to the opening widths Wi and Wo, respectively.

In the cell stack 2 of Embodiment 2, a plurality of cell frames 3 are stacked so as to be shifted from one another. In a state where the cell frames 3 are stacked, as shown in FIG. 10A, in two adjacent frame bodies 32, the inlet 33i of the positive electrode liquid supply slit 33s provided on the one surface side of one frame body 32 is disposed so as to partly overlap, in the stacking direction, the inlet 34i of the negative electrode liquid supply slit 34s provided on the other surface side of the other frame body 32. Furthermore, as shown in FIG. 10B, the outlet 35o of the positive electrode liquid discharge slit 35s provided on the one surface side of one frame body 32 is disposed so as to partly overlap, in the stacking direction, the outlet 36o of the negative electrode liquid discharge slit 36s provided on the other surface side of the other frame body 32.

That is, in the cell stack 2 of Embodiment 2, as shown in FIGS. 10A and 10B, in two adjacent frame bodies 32, when viewed in the stacking direction, the inlet 33i and the outlet 35o provided on the one surface side of one frame body 32 are, respectively, shifted from the inlet 34i and the outlet 36o provided on the other surface side of the other frame body 32 in the circumferential direction. Accordingly, the corners of the inlets 33i and 34i (portions surrounded by circles in FIG. 10A) and the corners of the outlets 35o and 36o (portions surrounded by circles in FIG. 10B) each do not face one another. Therefore, it is possible to avoid concentration of contact pressure at the corners of the inlets 33i and 34i and at the corners of the outlets 35o and 36o. Consequently, breakage such as cracking is unlikely to occur at the corners of the openings (inlet 33i and 34i and outlets 35o and 36o) in the slits 33s to 36s for positive and negative electrodes.

Regarding the inlet 33i and the outlet 35o provided on the one surface side of one of two adjacent frame bodies 32 and the inlet 34i and the outlet 36o provided on the other surface side of the other frame body 32, the overlapping range Lx in the stacking direction may be, for example, 10% to 99% relative to the opening width Wi or Wo (refer to FIG. 9). In this embodiment, the overlapping range Lx is preferably 20% or more, 30% or more, or 50% or more and is preferably 95% or less or 90% or less relative to the opening width Wi or Wo.

The cell stack 2 according to Embodiment 2 can have the same advantages as those described in Embodiment 1.

APPLICATION OF EMBODIMENTS OF THE PRESENT INVENTION

The frame bodies, cell frames, and cell stacks according to the embodiments of the present invention can be suitably used for RF batteries.

The invention claimed is:

1. A frame body which is provided around a bipolar plate disposed between a positive electrode and a negative electrode of a redox flow battery,
the frame body comprising:
a positive electrode liquid supply manifold through which a positive electrode electrolyte to be supplied to the positive electrode flows, and a positive electrode liquid discharge manifold through which the positive electrode electrolyte discharged from the positive electrode flows, the manifolds being provided so as to pass through the frame body;
a positive electrode electrolyte flow path which is provided on the one surface side of the frame body and includes a positive electrode liquid supply slit for supplying the positive electrode electrolyte from the positive electrode liquid supply manifold to the positive electrode, the positive electrode liquid supply slit having an inlet which opens toward the inside of the frame body; and a positive electrode liquid discharge slit for discharging the positive electrode electrolyte from the positive electrode to the positive electrode liquid discharge manifold, the positive electrode liquid discharge slit having an outlet which opens toward the inside of the frame body;
a negative electrode liquid supply manifold through which a negative electrode electrolyte to be supplied to the negative electrode flows, and a negative electrode liquid discharge manifold through which the negative electrode electrolyte discharged from the negative electrode flows, the manifolds being provided so as to pass through the frame body; and
a negative electrode electrolyte flow path which is provided on the other surface side of the frame body and includes a negative electrode liquid supply slit for supplying the negative electrode electrolyte from the negative electrode liquid supply manifold to the negative electrode, the negative electrode liquid supply slit having an inlet which opens toward the inside of the frame body; and a negative electrode liquid discharge slit for discharging the negative electrode electrolyte from the negative electrode to the negative electrode liquid discharge manifold, the negative electrode liquid discharge slit having an outlet which opens toward the inside of the frame body,
wherein at least one pair among a pair of the inlets of the positive electrode liquid supply slit and the negative electrode liquid supply slit and a pair of the outlets of the positive electrode liquid discharge slit and the negative electrode liquid discharge slit are provided so as to partly overlap each other in the thickness direction of the frame body.

2. The frame body according to claim 1, wherein, regarding at least one pair among the pair of the inlets of the positive electrode liquid supply slit and the negative electrode liquid supply slit and the pair of the outlets of the positive electrode liquid discharge slit and the negative electrode liquid discharge slit, the overlapping range in the thickness direction of the frame body is 10% to 99% relative to the opening width thereof.

3. A cell frame comprising:
the frame body according to claim 1; and
the bipolar plate provided inside the frame body.

4. A cell stack comprising the cell frame according to claim 3.

5. A redox flow battery comprising the cell stack according to claim 4.

6. A cell stack comprising a cell frame including a bipolar plate disposed between a positive electrode and a negative electrode of a redox flow battery, and a frame body provided around the bipolar plate, the frame body including:
a positive electrode liquid supply manifold through which a positive electrode electrolyte to be supplied to the positive electrode flows, and a positive electrode liquid discharge manifold through which the positive electrode electrolyte discharged from the positive electrode flows, the manifolds being provided so as to pass through the frame body;
a positive electrode electrolyte flow path which is provided on the one surface side of the frame body and includes a positive electrode liquid supply slit for supplying the positive electrode electrolyte from the positive electrode liquid supply manifold to the positive electrode, the positive electrode liquid supply slit having an inlet which opens toward the inside of the frame body; and a positive electrode liquid discharge slit for discharging the positive electrode electrolyte from the positive electrode to the positive electrode liquid discharge manifold, the positive electrode liquid discharge slit having an outlet which opens toward the inside of the frame body;

a negative electrode liquid supply manifold through which a negative electrode electrolyte to be supplied to the negative electrode flows, and a negative electrode liquid discharge manifold through which the negative electrode electrolyte discharged from the negative electrode flows, the manifolds being provided so as to pass through the frame body; and a negative electrode electrolyte flow path which is provided on the other surface side of the frame body and includes a negative electrode liquid supply slit for supplying the negative electrode electrolyte from the negative electrode liquid supply manifold to the negative electrode, the negative electrode liquid supply slit having an inlet which opens toward the inside of the frame body; and a negative electrode liquid discharge slit for discharging the negative electrode electrolyte from the negative electrode to the negative electrode liquid discharge manifold, the negative electrode liquid discharge slit having an outlet which opens toward the inside of the frame body, wherein both a pair of the inlets of the positive electrode liquid supply slit and the negative electrode liquid supply slit and a pair of the outlets of the positive electrode liquid discharge slit and the negative electrode liquid discharge slit are provided so as to overlap each other in the thickness direction of the frame body, and wherein, in a state where the cell frames are stacked, and the one surface side of the frame body of one of two adjacent cell frames faces the other surface side of the frame body of the other cell frame, the inlet of the positive electrode liquid supply slit and the outlet of the positive electrode liquid discharge slit provided on the one surface side of one frame body are disposed so as to partly overlap, in the stacking direction, the inlet of the negative electrode liquid supply slit and the outlet of the negative electrode liquid discharge slit provided on the other surface side of the other frame body, respectively.

7. A redox flow battery comprising the cell stack according to claim 6.

* * * * *